United States Patent [19]
Walling et al.

[11] 3,844,420
[45] Oct. 29, 1974

[54] PIPE RACKING APPARATUS
[75] Inventors: James Bernard Walling; Richard A. Van Wormer, both of Houston, Tex.
[73] Assignee: Byron Jackson Inc., Long Beach, Calif.
[22] Filed: Nov. 28, 1971
[21] Appl. No.: 197,553

Related U.S. Application Data
[63] Continuation of Ser. No. 868,550, Oct. 22, 1969.

[52] U.S. Cl............................. 214/1 P, 214/2.5
[51] Int. Cl............................. E21b 19/04
[58] Field of Search.......... 214/1 P, 1 PA, 1 PB, 2.5, 214/16 B, 8.5 G, DIG. 3; 175/85

[56] References Cited
UNITED STATES PATENTS
| | | | |
|---|---|---|---|
| 2,656,052 | 10/1953 | Tucker | 214/2.5 |
| 3,158,211 | 11/1964 | McCue et al. | 214/2.5 X |
| 3,501,017 | 3/1970 | Johnson et al. | 214/2.5 X |

*Primary Examiner*—Frank E. Werner
*Attorney, Agent, or Firm*—John O. Evans, Jr.; Donald W. Banner

[57] ABSTRACT

Pipe racking apparatus including a feeder for horizontal pipe racks which have horizontally spaced pipe racking beams providing pipe positioning elements for laterally spacing stands of pipe, the feeder including pipe stand engaging lugs carried by an endless chain which is movable in either direction to rack or unrack pipe stands. The chain is movable in increments corresponding to the spacing of the pipe stands by a double acting cylinder-piston actuator and opposing shifter dogs engageable with the endless chain to move the latter in opposite directions. A pick-up finger is movable between retracted and projected positions for engaging and moving a pipe stand to a preliminary racked position engageable by the feeder for movement to a racked position.

10 Claims, 22 Drawing Figures

INVENTORS.
JAMES BERNARD WALLING
RICHARD A. VAN WORMER
BY
John O. Evans, Jr.
ATTORNEY

INVENTORS.
JAMES BERNARD WALLING
RICHARD A. VAN WORMER
BY
John O. Evans, Jr.
ATTORNEY

PIPE RACKING APPARATUS

This is a continuation of U.S. Pat. application Ser. No. 868,550 filed Oct. 22, 1969.

BACKGROUND OF THE INVENTION

In the racking of well pipe such as drill pipe, drill collars and the like on horizontally spaced pipe supporting beams, it is desirable that the individual pipe stands be constrained against movement, this being particularly desirable when the pipe racking apparatus is part of a platform located on a drilling vessel such as a barge or the like subjected to the effects of storms and normal wave action of a body of water. Thus in the copending application for U.S. Letters Patent of Langowski and Walling Ser. No. 868,549 filed concurrently herewith entitled HORIZONTAL PIPE RACK there is illustrated a pipe rack which is ideally suited to the horizontal racking of pipe and which holds each stand of pipe in a predetermined position.

The pipe stands, in the racking and unracking of pipe employing the above-identified horizontal pipe rack, may be moved to and from the predetermined positions in various manners, but if each stand of pipe, during the racking and unracking operations, is to be positively held against undesired movement, the individual stands must be moved progressively to and from the racked positions while suitably confined.

SUMMARY OF THE INVENTION

The present invention provides feeder apparatus for use in combination with horizontal pipe rack apparatus, wherein the individual stands of pipe are engaged by the feeder apparatus and moved successively between racked and unracked positions.

The present invention furthermore provides feeder apparatus adapted to engage a layer of pipe supported on horizontally spaced rack beams and to move the entire layer toward and away from racked positions while individually confining the stands of pipe in relatively spaced relationship and against undesired movement.

An object of the invention is to provide pipe racking apparatus including a horizontal pipe rack and pipe positioning means cooperative with the pipe rack for successively racking and unracking stands of well pipe, while at all times holding the pipe stands against undesired movement, the apparatus being durable and easy to operate and maintain.

DESCRIPTION OF THE PREFERRED EMBODIMENTS

Figure 1:
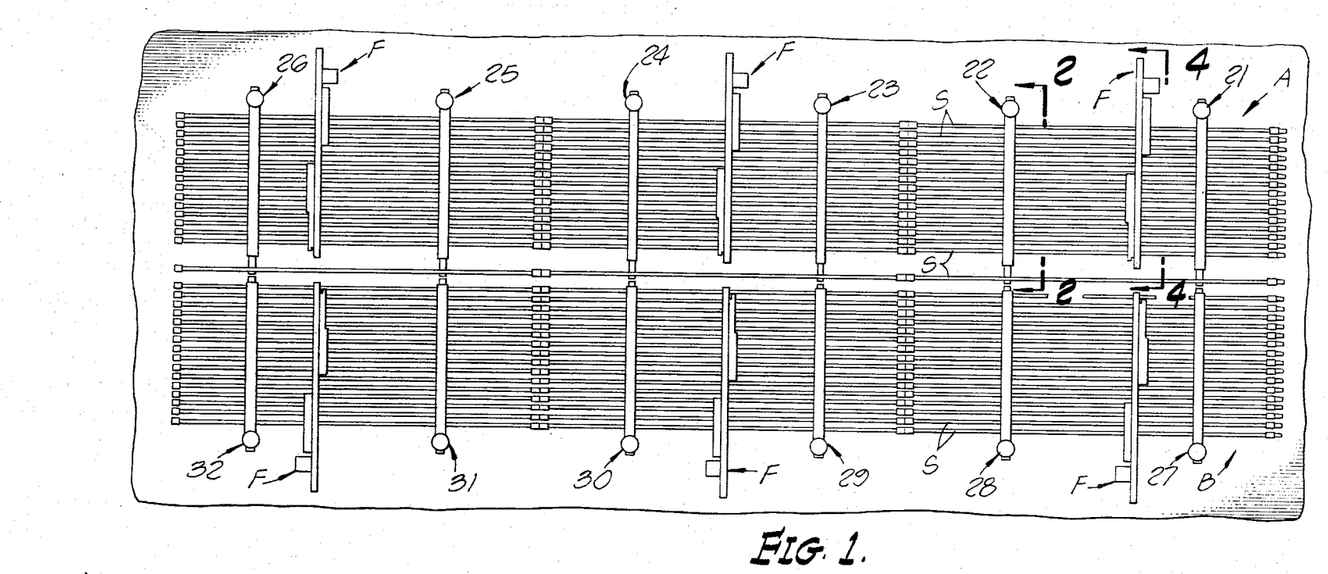
FIG. 1 is a top plan view of pipe racking apparatus according to the invention and illustrating schematically opposed racking sections.
Figure 2:
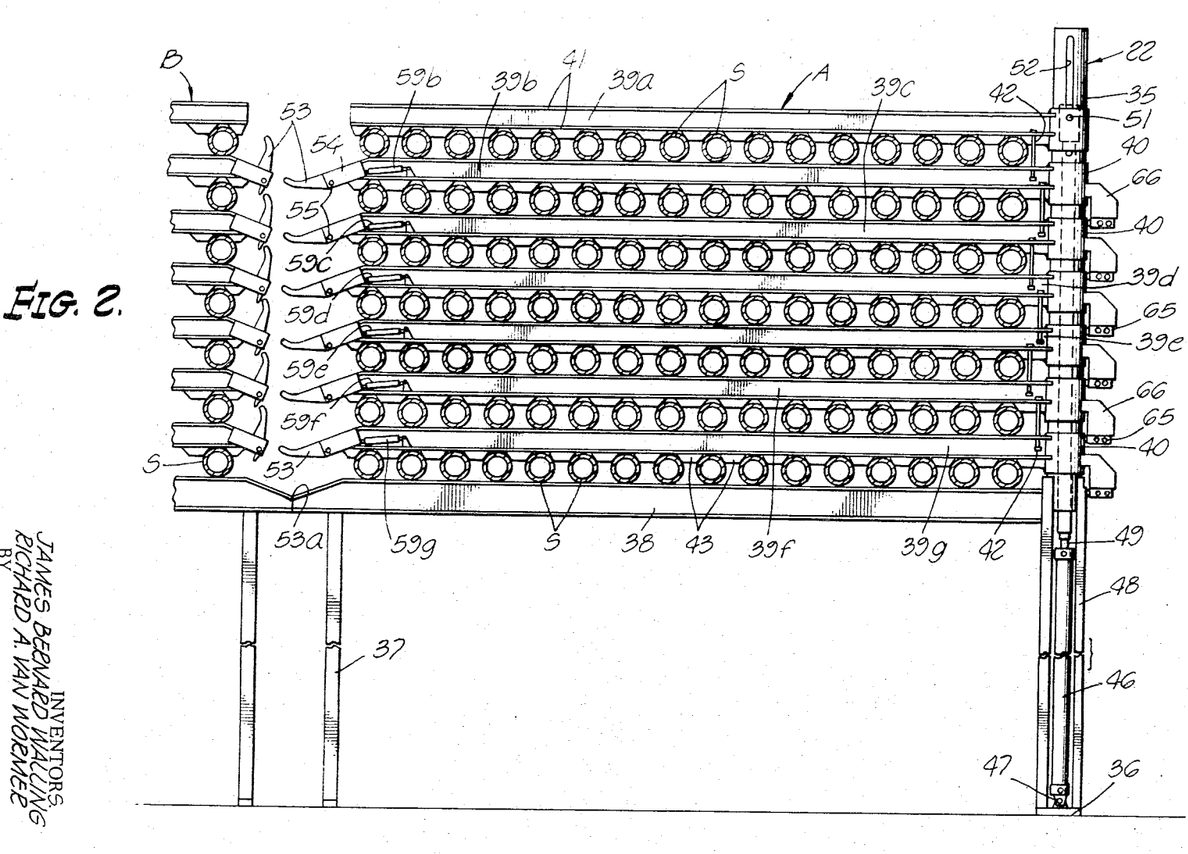
FIG. 2 is an enlarged fragmentary view taken on the line 2—2 of FIG. 1 with one of the pipe racking sections partially broken away.
Figure 3:
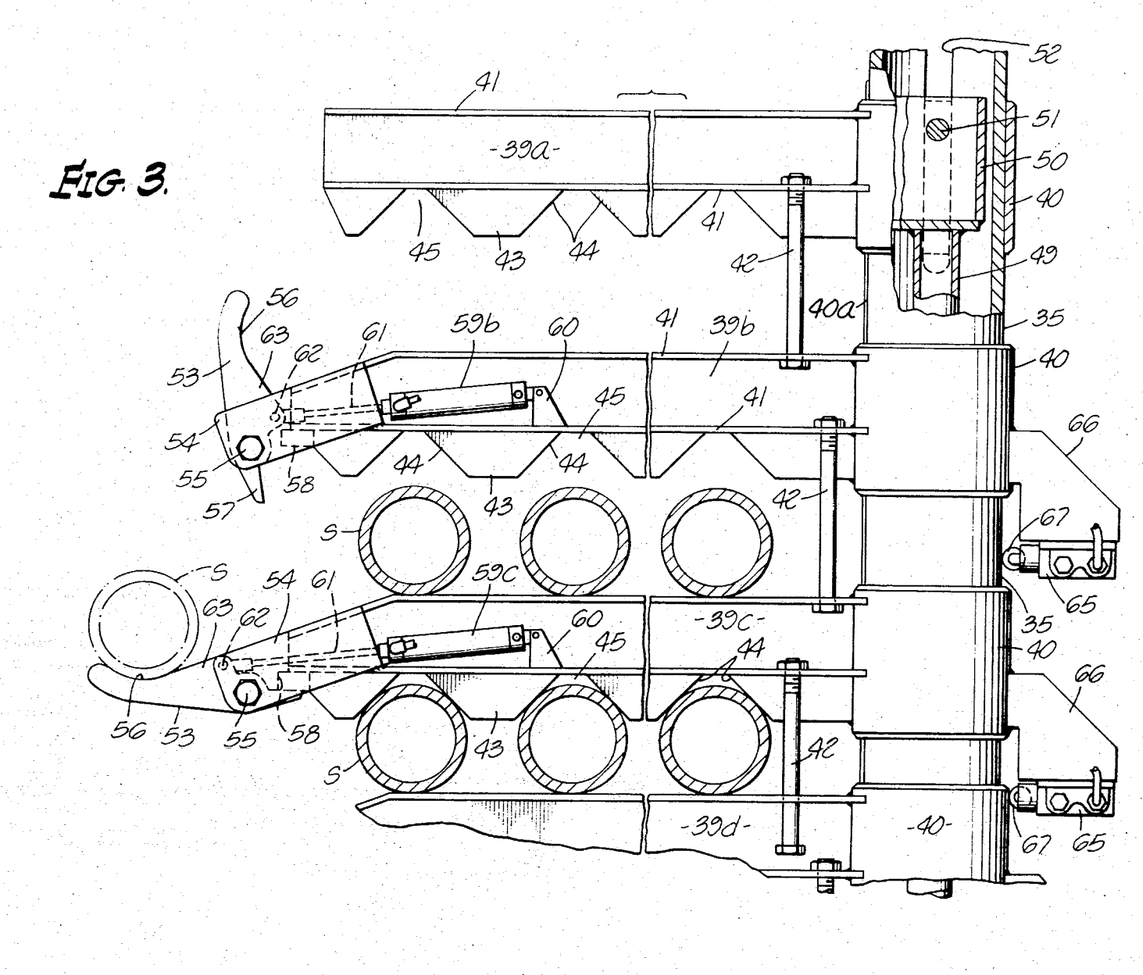
FIG. 3 is an enlarged fragmentary view partly in elevation and partly in section showing the details of the mounting of the pipe racking beams on a post of the rack apparatus.

Referring first to the racking apparatus of FIGS. 1 through 3, FIG. 1 illustrates what may be termed a double section racking installation for oil well pipe or the like. The apparatus is characterized as a double section installation inasmuch as it involves face-to-face series of pipe racks as will be hereinafter described.

The racking apparatus includes a number of racks generally denoted at 21, 22, 23, 24, 25 and 26 in racking section A, and 27, 28, 29, 30, 31 and 32 in racking section B. The racks of each section are laterally spaced apart and are aligned so as to accommodate stands of well pipe which, in the illustrative embodiment, are designated S, each of which stands comprises a plurality of so-called joints of pipe. In the illustrative apparatus a pair of the racks are employed for supporting each of the joints of the composite stand of joints, but a lesser number of racks may be employed or, if the drilling platform is equipped for the running of stands of less than three joints, fewer racks are required. The racks 21 through 32 are exemplified by the rack 22, the details of which will be understood upon reference to FIGS. 2 and 3. More particularly, the rack comprises a post 35 suitably supported in an upright position on a base 36. In spaced relation to the post 35 is a supporting leg 37 also supported on the base or platform 36, and extending between the post 35 and the leg 37 is what may be characterized as a transom 38 which forms the lowermost racking support for the pipe stands S. Above the transom 38 the post 35 supports a plurality of horizontally extended and elongated rack beams designated from top to bottom 39a through 39g, respectively. Each of the beams 39a–39g is welded or otherwise suitably made a part of a collar or sleeve 40 which is vertically slidably disposed upon the post 35, the sleeves or collars 40 and the arms 39a–39g being stacked one above the other upon the post 35. In order to maintain the sleeves 40 against rotation about the post 35 a vertically disposed key 40a may be provided on the post 35 to engage each collar 40.

Each of the rack beams 39a–39g is illustrated as being in the form of an I-beam having top and bottom webs 41. Means are provided for interconnecting the successive vertically spaced beams 39a–39g with a lost-motion connection, such means illustratively including through bolts 42 extended between the lower web 41 of each beam into the upper web of the subjacent beam, these bolts slidably extending through the webs so as to allow the beams and their supporting sleeves 40 to move toward one another, while limiting the upward movement of each beam away from the subjacent beam. Such movement of the beams away from one another allows the pipe stands S to be laterally moved between the spaced apart rack beams 39a–39g between racked and unracked positions by a feeder apparatus hereinafter to be described and generally denoted at F in FIG. 1. Thus, as seen in FIG. 3, the beams are capable of vertical movement away from the subjacent beam a sufficient distance to clear the pipe strings S, beams 39a and 39b being elevated to allow removal of the pipe stands S from rack beam 39c.

Beneath each beam 39a–39g it is provided with pipe engaging spacer means in the form of downwardly extended lugs 43 having beveled sidewalls 44, 44, such lugs being aligned in spaced relation along the respective beams 39a–39g and being adapted to form a generally triangular space 45 between adjacent spacer lugs whereby to accommodate pipes of a range of diameters and to maintain such pipes in laterally spaced relation with respect to the beam on which the pipe rests.

Means are provided for elevating and allowing the lowering of the beams 39a–39g and, in the illustrative embodiment, as seen in FIGS. 2 and 3, such means includes an elongated hydraulic actuator cylinder 46 connected at its lower end 47 within the lower portion 48 of the post 35. A rod 49 extends upwardly from the actuator cylinder 46 through the post 35 and, at its upper end, is provided with a head 50. A cross-pin 51 extends transversely through the uppermost beam supporting collar or sleeve 40, through a vertically elongated slot 52 in the post 35, and through the head 50 so as to interconnect the head 50 with the uppermost collar or sleeve 40. Thus, when the actuator cylinder 46 is operated to effect extension of the rod 49 the supporting collar or sleeve 40 connected to the rod head 50 will be correspondingly elevated. As the upper beam 39a is elevated, the other beams 39b–39g therebelow will be successively elevated when the through bolts 42 reach the end of their free motion with respect to the subjacent beams. Thus the upper beam 39a will be elevated until the through bolts 42 commence to elevate the next subjacent beam 39b, at which time the upper two beams will move conjointly until the next beam therebelow is picked up by the through bolts 42, and so on in sequence, until all of the beams have been elevated. When the beams are being lowered, the lowermost beam 39g will bottom first and then the successive upwardly spaced beams will bottom. Thus it is apparent that with a rack assembly as thusfar described, pipe stands may be racked starting at the bottom and unracked starting at the top of the respective rack assemblies 21 through 32, each of which may be constructed as just described and each of which will incorporate one of the actuator cylinders 46.

During the racking and unracking of the pipe stands S from a group of the pipe racks 27 through 32, for example, it is desirable that a stand be located so as to facilitate its placement between or removal from a pair of the vertically spaced rack beams 39a–39g. Accordingly, each of the rack beams 39b–39g, but not the uppermost 39a of said beams, is provided at its outer or free end with a finger 53. Each finger 53 is pivotally supported on a downward end extension 54 of the rack beam by a pivot bolt 55 or the like for movement between a substantially vertical position, at which the finger is retracted, and a substantially horizontal position, at which the finger is projected. In the retracted position the fingers 53 are out of the way, but in the projected position, the fingers of adjacent rack assemblies are adapted to support a stand of pipe as shown in broken lines in FIG. 3. The fingers 53 are accordingly provided with an arched extremity providing a seat 56 for accommodating the pipe string. In order to limit the movement of the fingers toward the extended position, each finger has at its end opposite the seat 56 a stop lug 57 adapted to abut beneath a stop plate or other suitable abutment 58 provided beneath the beam 39b–39g which supports the finger 53.

Means are provided for shifting the fingers 53 between their retracted and projected positions, and such means includes, in the illustrative embodiment, actuator cylinders 59b through 59g for each finger 53 on the respective beams 39b through 39g. The actuator cylinders 59b through 59g, as exemplified in FIG. 3, are each pivotally connected at one end to an anchor bracket 60 provided between the edge flanges 41 of the I-beam racks 39b–39g, and projecting from each actuator cylinder 59b through 59g is an operating rod 61 which is pivotally connected as at 62 to a portion 63 of the respective fingers 53 between the seat 56 and the pivot bolt 55. When the operating rods 61 are retracted, the fingers 53 are retracted, and when the operating rods 61 are projected, the fingers 53 are projected. Means are provided whereby when the rack beams 39b–39g are elevated, the fingers 53 are automatically retracted, and when these beams are lowered into engagement with racked pipe strings the fingers are automatically projected to allow for the racking or unracking of pipe from the top of the beams 39b–39g and the transom 38. Such means for automatically effecting movement of the fingers 53 comprises, in the illustrative embodiment, means for controlling the application of air under pressure to the respective actuator cylinders 59 b–59g, and more particularly a valve 65 is supported on a valve supporting block 66 which is in turn welded or otherwise connected to each of the support sleeves or collars 40, except the uppermost one of the latter which has no finger 53. The valve 65 includes a roller actuator 67 which normally may be in rolling contact with the post 35 and which, upon downward movement of a beam 39b to 39g to a position engaging the pipe strings therebelow, will be actuated to the right upon engagement of the roller 67 with the larger diameter of the sleeve 40, as is apparent at the lowermost illustrated valve 65 in FIG. 3. It is believed to be unnecessary to illustrate the specific fluid connection between the valves 65 and the cylinders 59b–59g.

The feeder apparatus F previously referred to is cooperative with the pipe rack means previously described to effect movement of the pipe stands S along the respective rack beams 39b–39g between the racked positions as shown in FIG. 2 and successively unracked positions as shown in broken lines in FIG. 3.

In the illustrative embodiment each of the rack sections A and B has associated therewith three of the feeder apparatuses, one of the feeder apparatus F being employed in conjunction with each pair of the racks, as seen in FIG. 1.

Figures 4, 9:
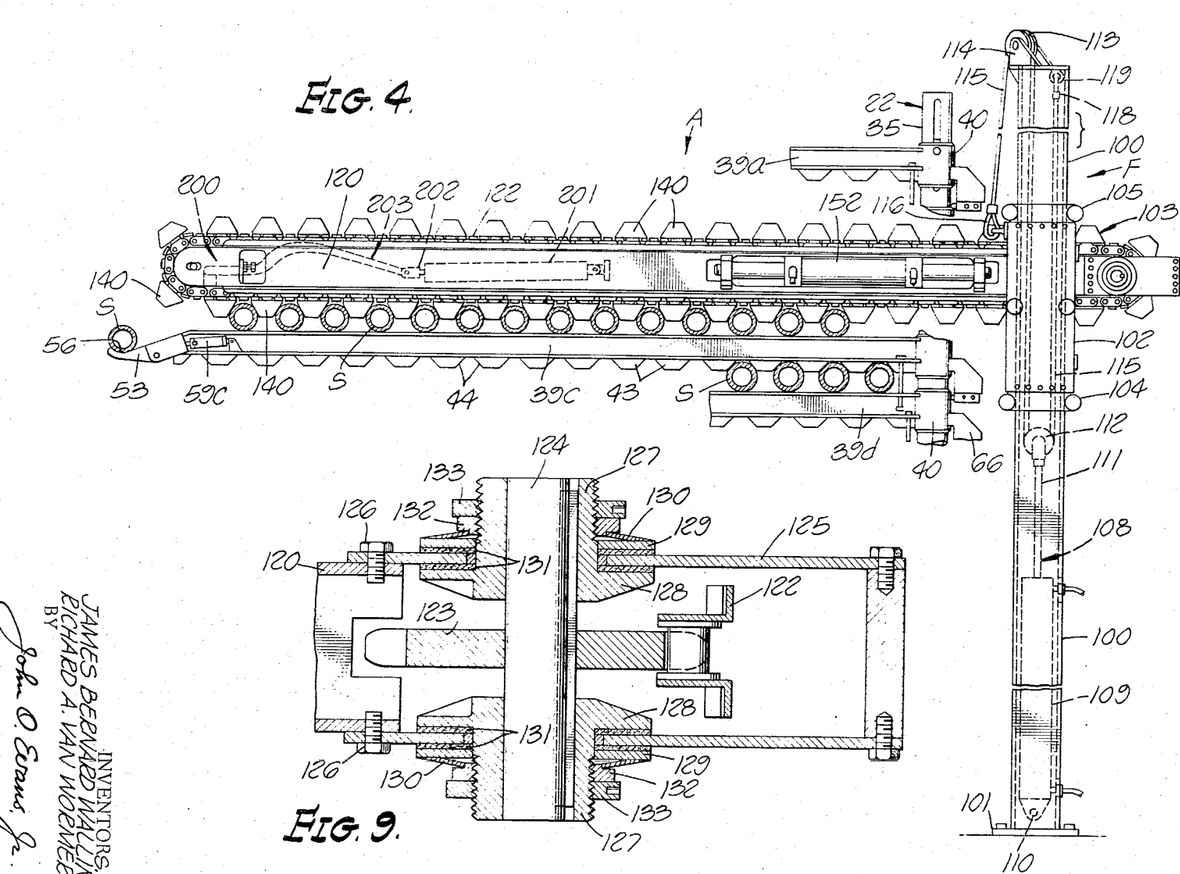
FIG. 4 is an enlarged fragmentary view taken on the line 4—4 of FIG. 1 showing pipe feeder apparatus engaged with a layer of pipe on the rack apparatus.
FIG. 9 is a detail view in section, as taken on the line 9—9 of FIG. 6.
Figure 5:
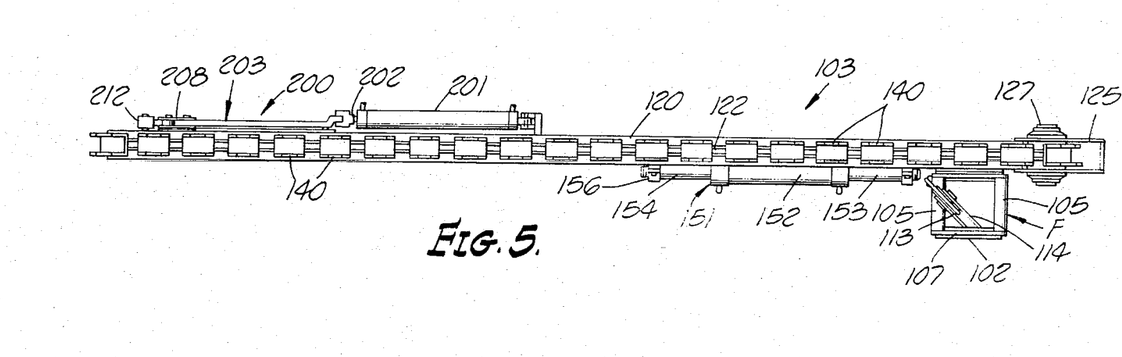
FIG. 5 is a top plan view of the pipe feeder apparatus.

More particularly, each feeder apparatus F as seen in FIG. 4 includes a vertical post 100 supported on a suitable base 101. Vertically movable upon the post 100 is a tubular support 102 which carries feeder conveyor means generally denoted at 103, the latter being adapted to engage each stand of pipe S in a layer racked upon one of the rack beams 39b through 39g and to successively move the stands to unracked positions, on the one hand, or to successively move the stands S to the racked positions at which the stands are engageable by the spacer lugs 43 of the pipe racks.

Figures 6, 7, 8:
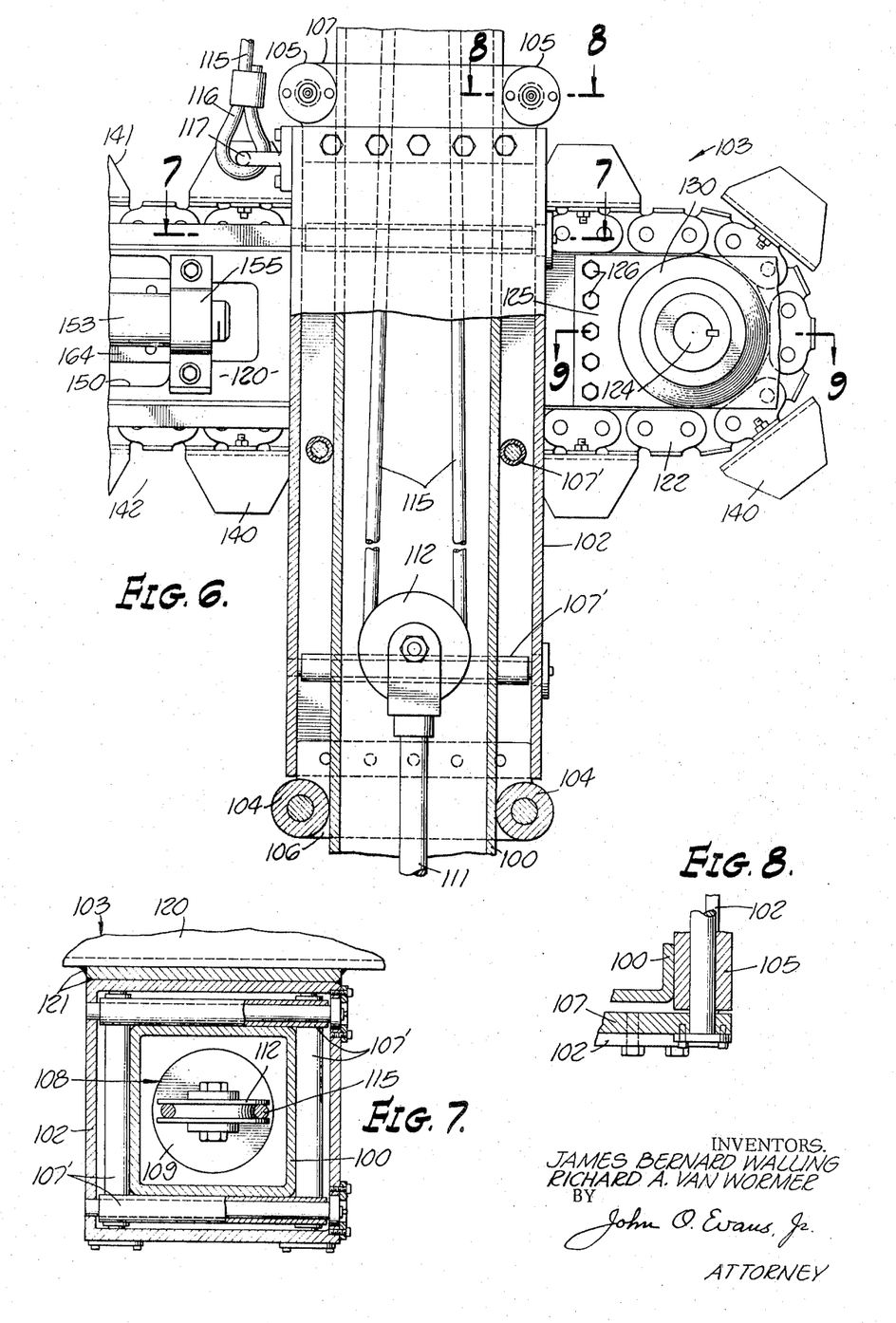
FIG. 6 is an enlarged fragmentary detail view partly in elevation with parts broken away showing the mounting of the feeder conveyor on a supporting post.
FIG. 7 is a detail view in section, as taken on the line 7—7 of FIG. 6.
FIG. 8 is a detail view in section, as taken on the line 8—8 of FIG. 6.

Referring to FIGS. 6 through 8, it will be noted that the post 100 is rectangular in form and the tubular support 102 is likewise rectangular in form, the latter being vertically shiftably mounted upon the post 100 by means of lower rollers 104 and upper rollers 105, respectively revolvably carried by brackets 106 and 107 which are suitably fastened to the lower and upper ends of the tubular support 102. Inner rollers 107' may also be provided within the tubular support 102 for rolling engagement with the post 100. In any event, the rollers 104, 105 and 107' prevent cocking of the support 102 on the post 100 so that the conveyor means 103, hereinafter to be more fully described, is supported in a horizontal position and is vertically shiftable in response to vertical movement of the support 102.

In the illustrative embodiment fluid pressure operated means 108 are provided for effecting vertical movement of the support 102. This means includes a fluid pressure operated actuator cylinder 109 secured as at 110 within the post 100 at the lower end thereof, the actuator cylinder 109 having a rod 111 projecting upwardly therefrom and at its upper end the rod 111 supports a pulley 112. Another pulley 113 is suitably mounted on a support 114 at the upper open end of the post 100. A cable or line 115 is anchored at one end 116 to an eye 117 provided on the supporting sleeve 102 (FIG. 6), the other end 118 of the cable 115 being anchored to an eye 119 within the upper end of the post 100 (FIG. 4). The cable extends about the respective pulleys 112 and 113 so that when the actuator rod 111 is retracted or moved downwardly the supporting sleeve 102 and the conveyor means 103 will be moved upwardly, but the conveyor means 103 may be lowered by allowing the actuator rod 111 to be moved upwardly from the cylinder 109.

Figure 18:
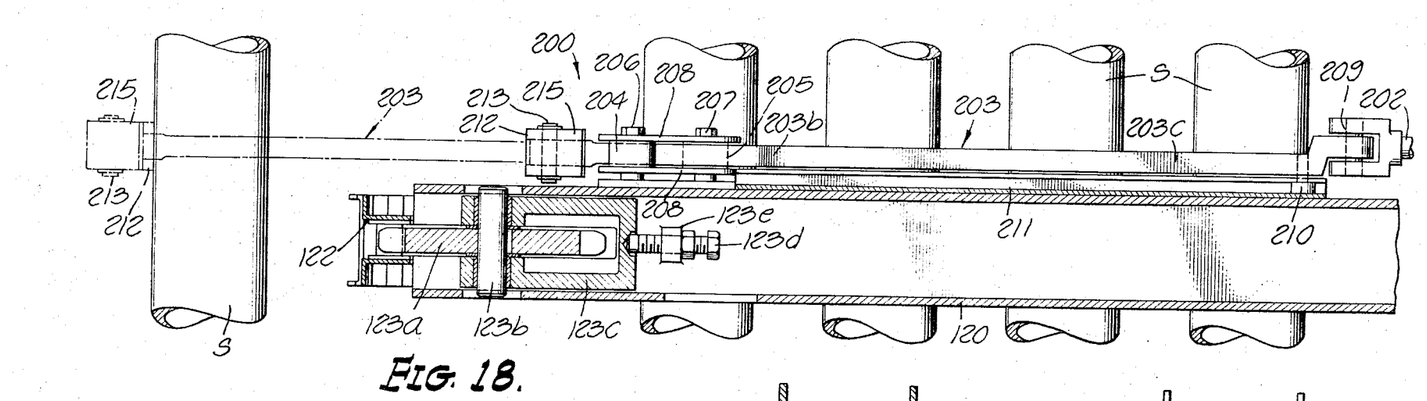
FIG. 18 is a view in horizontal section, as taken on the line 18—18 of FIG. 17.

The conveyor means 103 comprises an elongated hollow beam 120 which is welded as at 121 (FIG. 7) or otherwise suitably attached to the supporting sleeve 102 so as to extend generally horizontally therefrom between selected rack arms 39a–39g, as will hereinafter be described. Extending longitudinally about the beam is an endless chain 122, the beam 120 having sprockets at its opposite ends about which the chain 122 is adapted to travel in an endless path. One such sprocket is shown in FIG. 9 at 123, this sprocket being keyed to a shaft 124, the opposite ends of which are supported in a frame 125 fastened as at 126 to the end of the beam 120. Friction means are provided in association with this sprocket 123 for adjustably applying a drag to the chain 122 whereby to hold the same in a selected position against inadvertent movement while enabling operation of the conveyor means to effect positioning of the pipe strings S. This friction means includes a pair of hubs 127 keyed to the opposite ends of the shaft 124 and having radial flanges 128 shiftably disposed on the hubs 127. In opposed relation to the flanges 128 are shiftable plates 129 which are biased by belville washers or other suitable spring means 130 toward the flanges 128. Friction lining material designated 131 is interposed between the flanges 128 and the sidewalls of the frame 125 as well as between the plate 129 and the sidewalls of the frame 125, the friction drag of the friction material 131 tending to prevent rotation of the pulley 123 and being adjustable by adjuster plates 132 which are threadedly mounted upon the ends of the hubs 127 so as to adjust the effective pressure of the spring means 130 on the plates 129 upon rotation of the plates 132. A second internally threaded lock plate 133 may also be threaded onto the hubs 127 to jam the adjuster plates 132 in place. The sprocket at the other end of the endless chain 122 is illustrated in FIG. 18 and is designated 123a. This sprocket 123a is keyed to a revolvable shaft 123b which is journalled in a slide 123c, the latter being shiftably disposed within the hollow beam 120 and adjustable by an adjuster screw 123d which is threadedly disposed in a supporting lug 123e within the frame 125. Thus the tension of the chain 122 is adjustable. The endless chain 122 supports a number of pipe engaging lugs or spacers 140, each having opposite tapered walls 141 defining with adjacent lugs 140 an intervening gap or space 142. These spacers 140 are spaced along the chain 122 and are so formed as to cooperate with the strings of pipe S when engaged therewith, whereby to hold the pipe strings in the same spaced relation that the lugs or spacers 43 of the rack arms 39a through 39g hold the pipe strings S on the respective subjacent rack beams.

Accordingly, with the feeder devices F disposed between adjacent racks the support sleeve 102 may be lowered to bring the conveyor chain, and more particularly the spacers 140 thereon, into engagement with the uppermost layer of pipe strings on the rack beams, as seen in FIG. 4. Subsequently, the conveyor chain 122 may be moved in either direction in increments equivalent to the spacing between adjacent pipe strings and the entire layer of pipe will be correspondingly moved during an unracking operation, and the successive pipe strings will be moved toward racked positions during a racking operation.

The means for effecting such movement of the chain 122 are illustrated in FIGS. 10 through 13.

Figure 10:
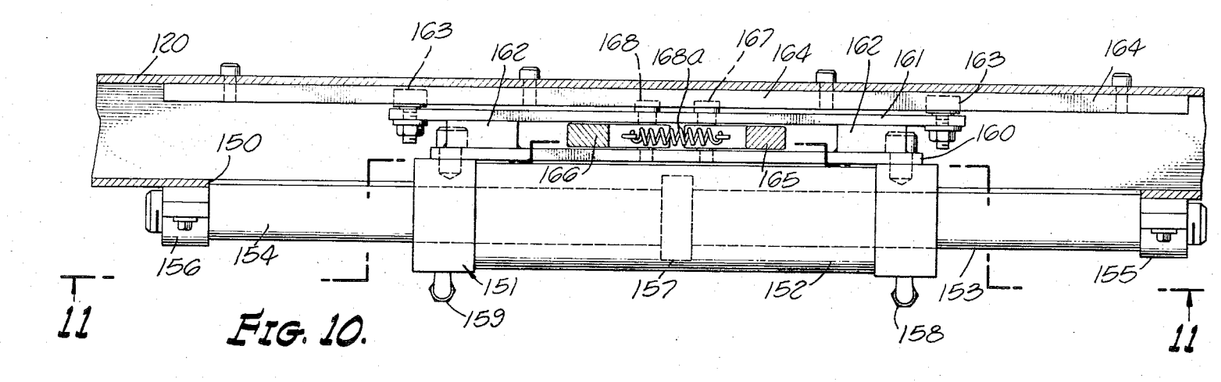
FIG. 10 is an enlarged detail view partly in top plan and partly in horizontal section illustrating the actuator means for the feeder conveyor.
Figure 11:
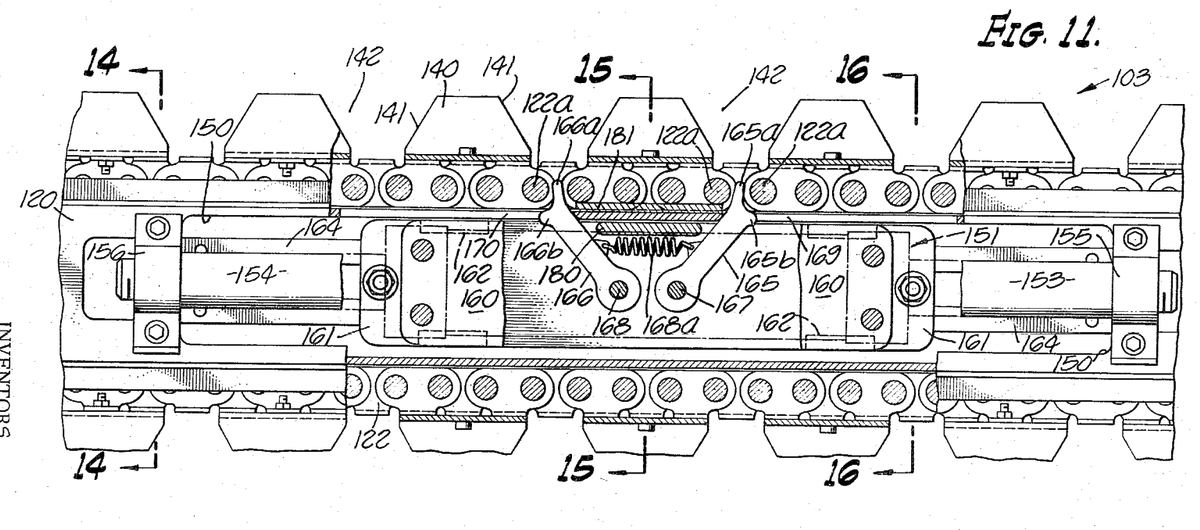
FIG. 11 is a view in vertical section, as taken on the line 11—11 of FIG. 10, with the actuator means shown in a neutral position.

Referring first to FIGS. 10 and 11, the supporting beam 120 will be seen to have an opening 150 in one side thereof. In this opening is reciprocably disposed a cylinder 151 of fluid pressure actuator means generally denoted at 152 and which includes a double-ended rod, the ends of which are designated 153 and 154, respectively, projecting from the actuator cylinder 151. The rod end 153 is connected at 155 to the beam 120, while the rod end 154 is connected at 156 to the beam 120 at opposite ends of the opening 150. Intermediate the rod ends 153, 154 is a piston 157, and the cylinder 151 includes fluid connectors 158 and 159 whereby fluid under pressure may be admitted to and exhausted from the cylinder 151 at either side of the piston 157 whereby to cause reciprocation of the cylinder 151 on the stationary rod ends. Secured to the inner side of the actuator cylinder 151 in parallel spaced relation thereto is a plate 161 supported on spacer lugs 162. The plate 161 supports rollers 163 engageable with a rail 164 within the beam 120 whereby to stabilize the cylinder 151. Pivotally mounted between the plates 160 and 161 are a pair of actuator dogs 165 and 166, the dog 165 being pivoted on a pin 167 and the dog 166 being pivoted on a pin 168 extending between the plates 160 and 161. A tension spring 168a is interconnected at its ends with the dogs 165 and 166 so as to normally bias the free ends of the dogs toward one another. The free end of the dog 165 projects upwardly through an elongated slot 169 in the upper wall of the beam 120, while the upper end of the dog 166 projects through an open slot 170 in the upper wall of the beam 120. The dog 165 has a finger 165a and the dog 166 has a finger 166a, these fingers projecting upwardly between adjacent rollers 122a of the chain 122. The dog 165 adjacent the finger 165a has a heel 165b and the dog 166 has a similar heel 166b for a purpose which will hereinafter appear.

Extending between the plates 160 and 161 is a horizontally extended stop 180 which is adapted to limit pivotal movement of the dogs 165 and 166 toward one another under the influence of the tension spring 168a.

Figure 12:
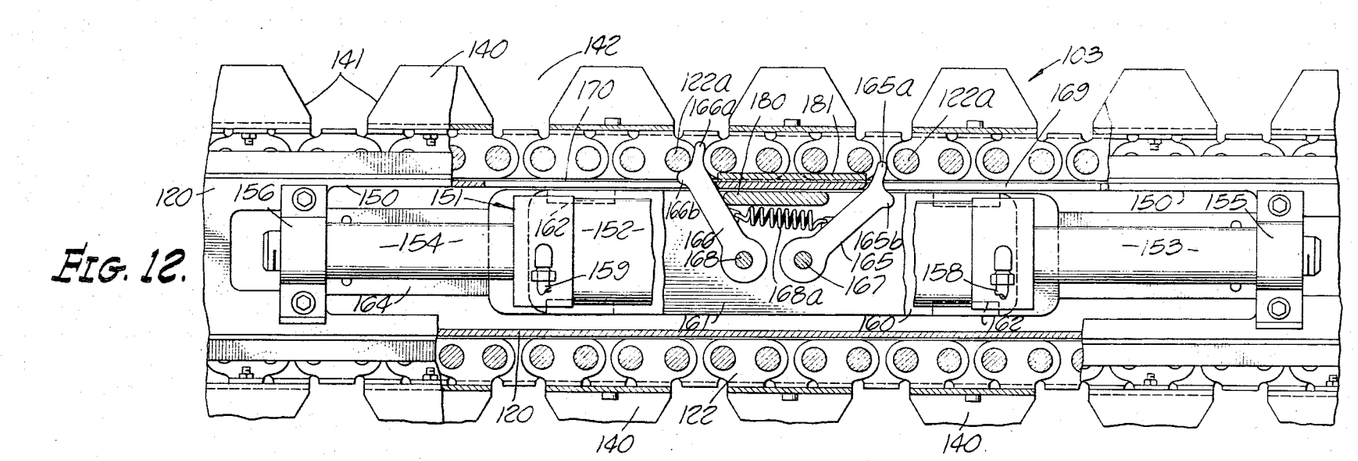
FIG. 12 is a view corresponding to FIG. 11 but illustrating the actuating means in an intermediate stage of movement of the feeder conveyor in a pipe racking direction.
Figure 13:
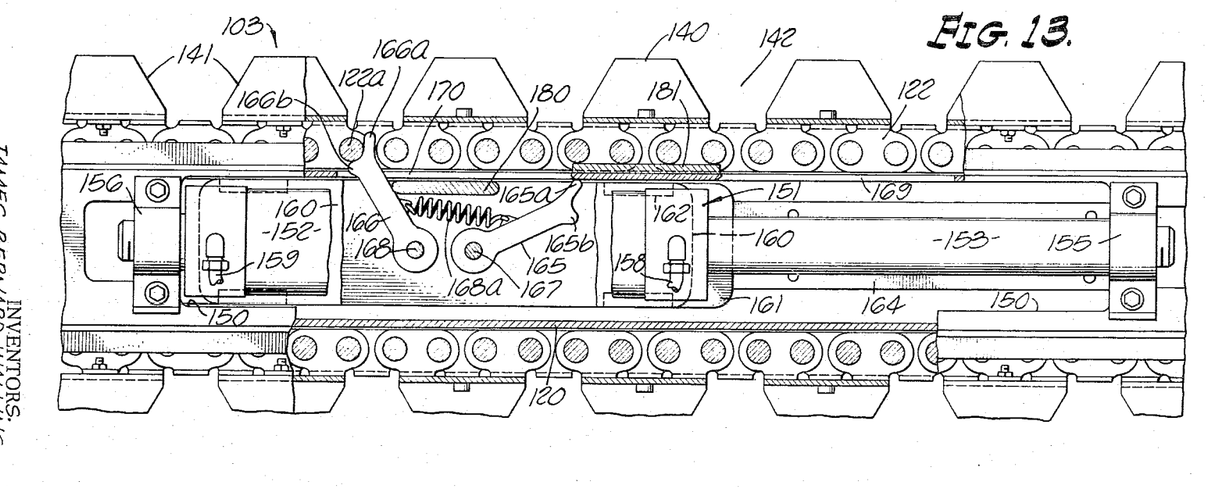
FIG. 13 is a view corresponding to FIGS. 11 and 12 illustrating further movement of the feeder conveyor in a pipe racking direction.
Figure 14:
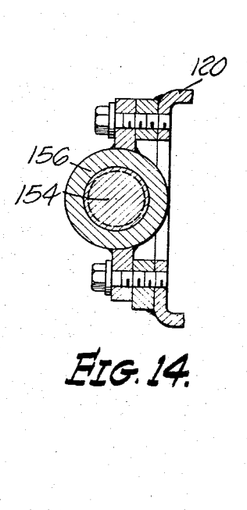
FIG. 14 is a view in vertical section, as taken on the line 14—14 of FIG. 11.
Figure 15:
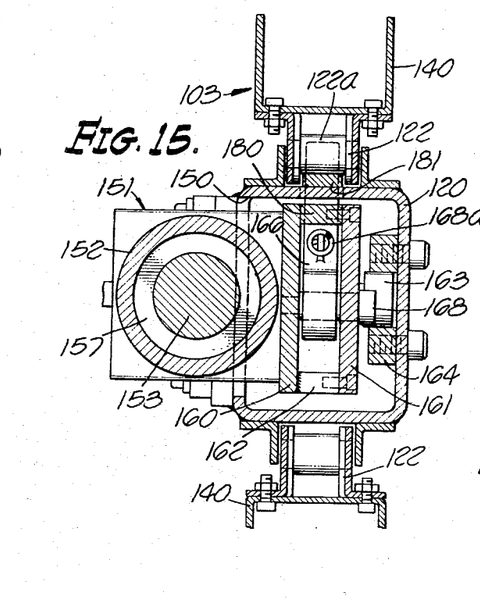
FIG. 15 is a view in vertical section, as taken on the line 15—15 of FIG. 11.
Figure 16:
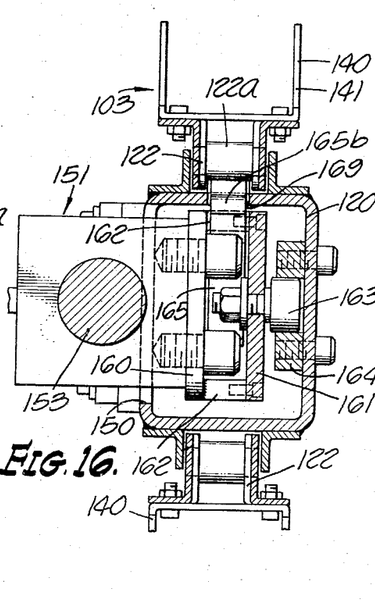
FIG. 16 is a view in vertical section, as taken on the line 16—16 of FIG. 11.

It will now be apparent with reference to FIG. 12 that if the actuator cylinder 151 be moved to the left causing corresponding movement of the dog supporting plates 160 and 161, the dog 166 will be caused to engage a chain roller 122a to the left of the dog finger 166a as the dog 166 pivots slightly to the right, moving the heel portion 166b upwardly so as to engage the last-mentioned roller 122a. Thereafter, the stop 180 will engage the dog 166 and cause movement of the latter as a unit along with the supporting plates 160, 161 and the actuator cylinder 151 to the left through the full stroke of the actuator cylinder along the rod end 154 to the position shown in FIG. 13. During such movement the finger 165a of the dog 165 will be cammed downwardly from between the rollers 122a of the chain 122 by a transverse portion 181 of the beam 120 which is disposed between the dogs 165 and 166 and which divides the openings or slots 169 and 170 through which the dogs project. It will also now be apparent that the reverse operation would occur if the actuator cylinder 151 were to be moved from a mid position to the right, so that the chain 122 would be moved an increment of movement in the other direction.

Movement of the actuator cylinder 151 to the left as viewed in FIGS. 10 through 13 is adapted to effect counter-clockwise movement of the chain 122 and movement of the pipe strings S towards racked position; conversely, movement of the actuator cylinder 151 to the right is adapted to effect clockwise movement of the chain 122 and movement of the pipe strings S towards unracked positions.

Assuming that the apparatus as seen in FIG. 4 is being employed to unrack the pipe strings S from the rack beam 39c, it will be noted that the rack arm finger 53 is in a lowered position and that the movement of the conveyor chain 122 should be in a clockwise direction. Such movement will be in increments responsive to reciprocation of the actuator cylinder 151 and the action of the dog 165 on the chain 122, and as the chain moves each increment another pipe string S will be released by the spacer lugs 140 as one of the lugs moves upwardly about the left-hand sprocket of the endless chain 122. Such pipe string will then gravitate along the inclined end of the beam 39c into the seat 56 provided by the finger 53. Such string may then be removed by suitable transfer equipment (not shown).

Figures 17, 19, 21:
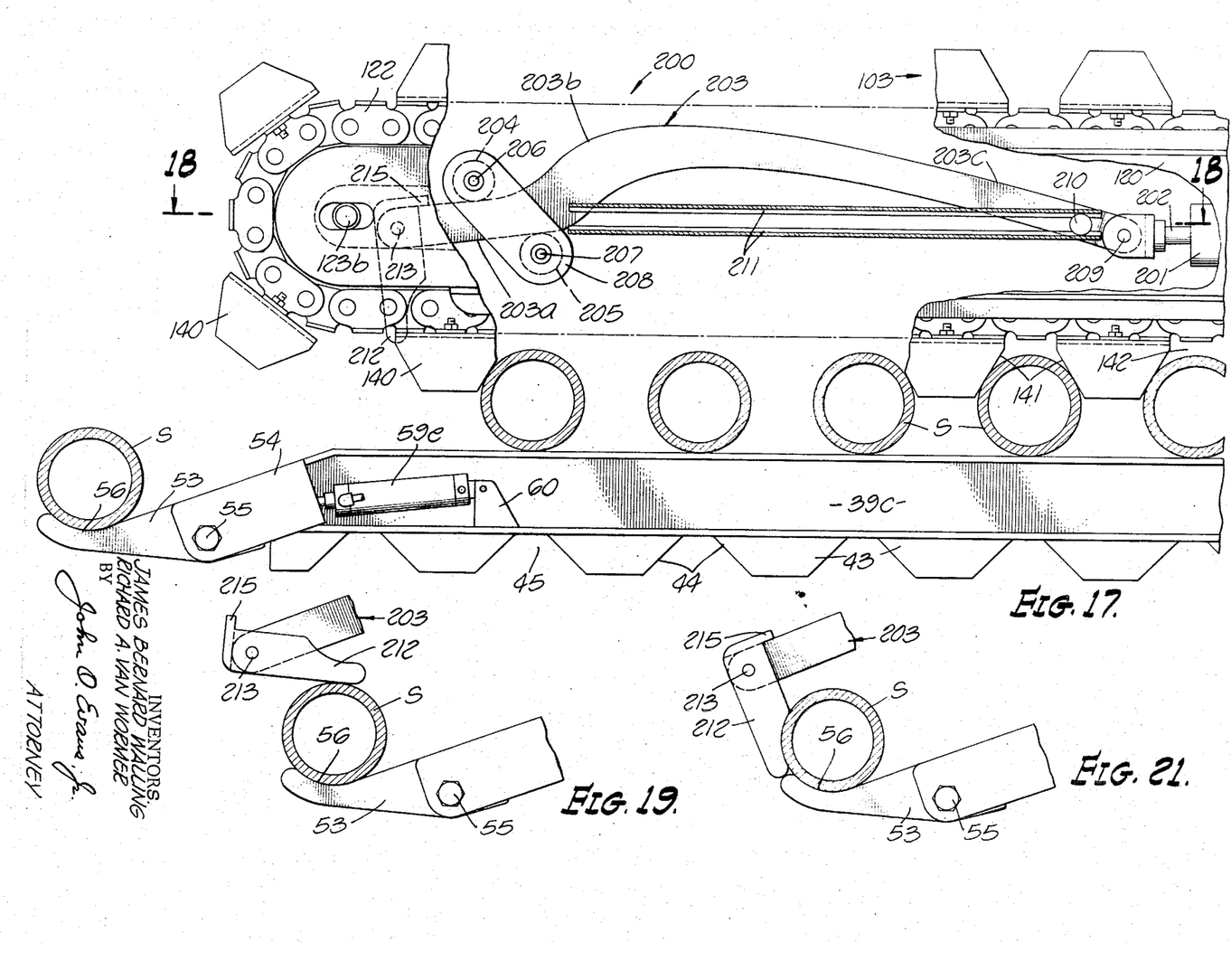
FIG. 17 is an enlarged fragmentary view partly in side elevation with parts broken away and illustrating a pick-up finger for moving stands of pipe onto the horizontal rack beams, and also showing the operating means for the pick-up finger.
FIG. 19 is a fragmentary detail view illustrating the pick-up finger engaged with a pipe stand and deflected thereby so as to pass thereover.
FIG. 21 is a fragmentary detail view illustrating the pick-up finger engaged with a pipe stand preliminary to moving the same onto a rack beam.
Figures 20, 22:
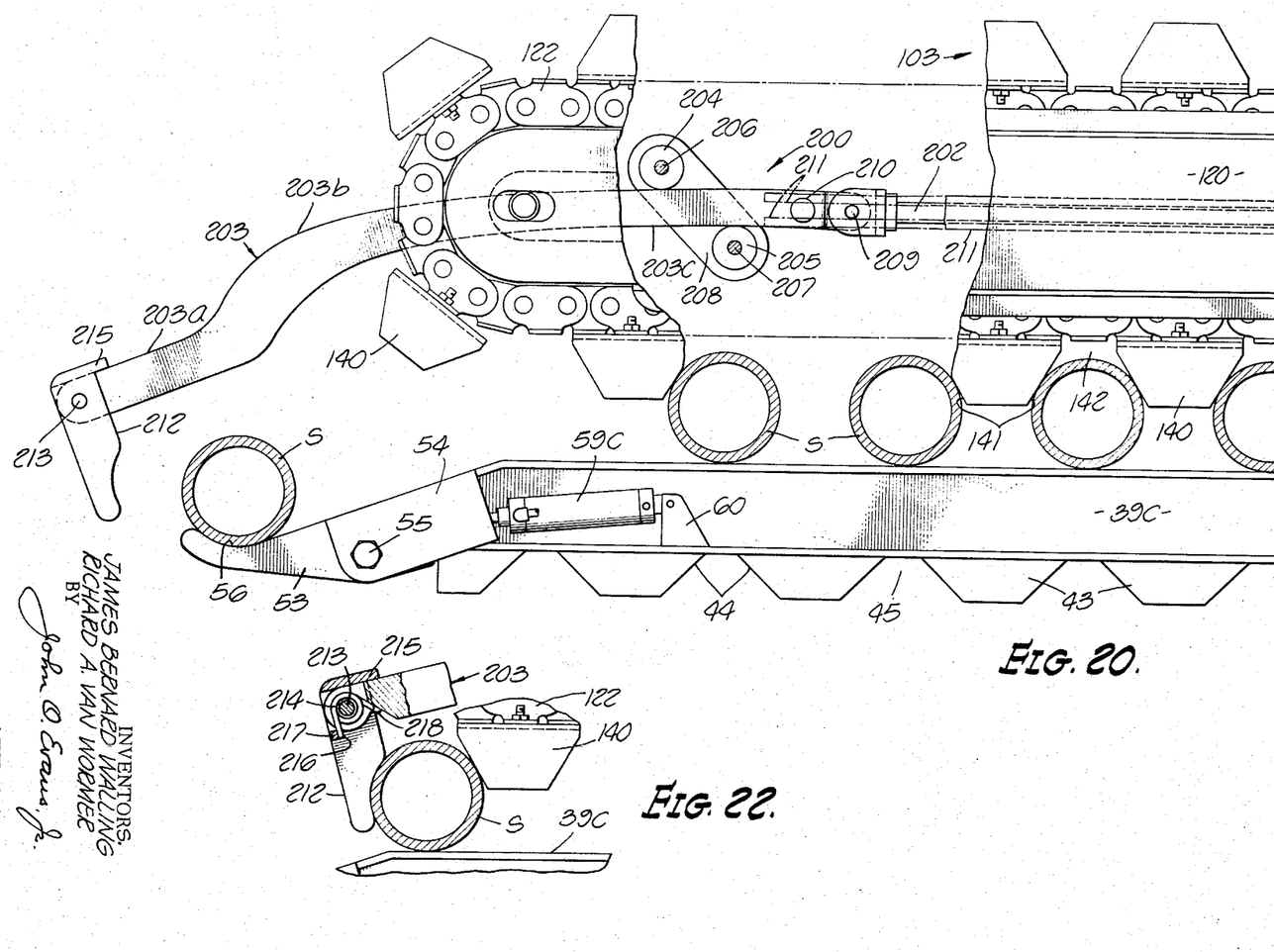
FIG. 20 is a view generally corresponding to FIG. 17 showing the projected position of the pick-up finger after it has passed over the pipe stand of FIG. 19.
FIG. 22 is a fragmentary detail view illustrating the pick-up finger engaged with the pipe and positioning the same on the rack arm for engagement by the feeder conveyor.

Suitable pipe pick-up means may be provided on the other hand for supplying pipe strings to the beam 39c if the apparatus is being employed in a pipe racking operation. Such means is herein illustrated in FIGS. 17 to 21 at 200. This pick-up means 200 includes, in the illustrative embodiment, an actuator cylinder 201 having a rod 202 projecting therefrom and extensible and retractible therein. Connected to the outer end of the rod 202 is an elongated pick-up arm 203 having a longitudinal formation adapted to effect a particular movement of the pick-up arm as it is caused to reciprocate through a pair of arm positioning rollers 204 and 205 which are carried by the conveyor supporting beam 120 adjacent its outer or free end, the rollers being mounted on suitable shafts 206 and 207 extended between appropriate supporting brackets 208 which are mounted on one side of the beam 120, as best seen in FIG. 18. In this connection, the pick-up arm 203 has a straight end portion 203a which merges with an upwardly arched portion 203b, this portion 203b in turn leading to a relatively straight inner end portion 203c. This inner end portion 203c is pivotally connected by a pin 209 to the outer end of the actuator rod 202, and adjacent this connection the pick-up arm 203 is provided with a stabilizing roller 210 projecting laterally therefrom into the space defined between a pair of guide rails 211 which extend longitudinally in parallel relation alongside the support beam 120. Thus, during extension and retraction of the pick-up arm 203 the inner end 203c thereof is caused to move substantially along the mid-plane of the support beam 120. When the pick-up arm 203 is in a fully retracted position, as shown in FIG. 17, the rollers 204 and 205 engage the outer end 203a of the pick-up arm 203 so that the arm in its entirety is substantially supported medially of the beam 120 in an out of the way position due to the offset of the outer end 203a and the inner end 203c provided by the upwardly arched intermediate section 203b of the pick-up arm 203. However, when the actuator cylinder 201 is pressurized to cause extension of the rod 202 therefrom, the outer end 203a of the pick-up arm 203 will be disposed, as seen in FIG. 20, forwardly and downwardly with respect to the supporting beam 120.

At the outer end 203a of the pick-up arm 203 is a pick-up finger 212 pivotally supported on a pin 213 carried by the pick-up arm 203. The finger 212 is normally biased by a torsion spring 214 to a position at which a stop lug 215 on the finger 212 engages with the upper surface of the pick-up arm 203, as clearly seen in FIG. 22, the spring having an end 216 abutting with a stop 217 on the finger 212 and the other end 218 of the spring engaging the pick-up arm 203. The arrangement of the spring 214 is such that the finger 212 is free to pivot about the pin 213, as seen in FIG. 19, whereby to allow movement of the outer end 203a of the pick-up arm 203 past a pipe string S seated in the seat 56 of the fingers 53 on the respective rack beams 39b through 39g, following which movement the spring 214 will bias the pick-up finger 212 to its normal position, as seen in FIG. 20.

After the pick-up finger 212 has been moved past a pipe string S, the actuator cylinder 210 may be pressurized to effect retraction of its rod 202 and retraction of the pick-up arm 203 to move the pick-up finger 212, as seen in FIG. 21, into engagement with the pipe string S and thereafter to move the pipe string S upwardly along the inclined finger 53 of the respective rack beams, thereby moving the pipe string into position for engagement by the next successive spacer lug 140 of the pipe string conveyor means as previously described.

It will be appreciated that in the use of the present invention a suitable number of the conveyor means F may be spaced horizontally along the respective rack sections A and B, as previously indicated and as illustrated in FIG. 1, and that means (not shown) may obviously be provided for supplying fluid under pressure to the respective actuator cylinders 201 of each of the conveyor means so as to effect their operation in unison. It is also apparent that in the use of the apparatus heretofore described the feeder conveyor means F jointly cooperate to maintain the pipe strings S in spaced relation along the respective pipe supporting beams as the layers of pipe stands are being incrementally moved onto or from the respective rack beams in response to the operation of the conveyor actuating cylinder means 152 in opposite directions.

Further description of the mode of operation of the apparatus described above is believed to be unnecessary, and it is understood that changes and alterations may be made in the apparatus without effecting its mode of operation or its facility for handling and racking well pipe, without departing from the invention.

We claim:

1. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said feeder means includes a plurality of horizontally extended and laterally spaced feeder conveyors having means for engaging said stands of pipe and moving the same on said rack beams to and from said positions, each of said conveyors including a horizontally extended support, an endless chain extended about said support, spaced pipe engaging members carried by said chain for engaging and maintaining the spaces between said pipe stands during movement thereof between said positions, said rack means including means for supporting a stand of pipe adjacent said rack beams, and said feeder means including pick-up means engageable with said last-mentioned stand of pipe for moving the same onto said rack beams for engagement by said pipe engaging members, said pick-up means including an elongated arm reciprocably carried by said support, actuator means connected to one end of said arm for effecting reciprocation of said arm, and pipe engaging finger means at the other end of said arm engageable with said stand of pipe upon movement of said other end of said arm past said stand of pipe and operable to shift said stand of pipe onto said rack beams responsive to movement of said arm toward said out-of-the-way position.

2. Apparatus for racking well pipe as defined in claim 1, wherein said finger means includes a finger element pivoted on said other end of said arm, and spring means acting on said finger element to normally bias the same to a projected position, said finger element being pivotally movable by said stand of pipe as said other end of said arm passes beyond said stand of pipe.

3. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said feeder means includes a plurality of horizontally extended and laterally spaced feeder conveyors having means for engaging said stands of pipe and moving the same on said rack beams to and from said positions, each of said conveyors including a horizontally extended support, an endless chain extended about said support, spaced pipe engaging members carried by said chain for engaging and maintaining the spaces between said pipe stands during movement thereof between said positions, and actuator means for intermittently moving said endless chain in increments equivalent to the space between adjacent pipe stands, said endless chain including links shiftable along said support, and said actuator means including dog means engageable with said links for shifting said endless chain with respect to said support.

4. Apparatus for racking well pipe as defined in claim 3, wherein said dog means comprises a carrier reciprocable with respect to said support, means for effecting reciprocation of said carrier, a pair of oppositely facing dogs pivotally connected to said carrier and engageable with said links of said endless chain for shifting said chain in one direction upon movement of said carrier in one direction and for shifting said endless chain in the other direction upon movement of said carrier in the other direction.

5. Apparatus for racking well pipe as defined in claim 3, wherein said dog means comprises a carrier reciprocable with respect to said support, means for effecting reciprocation of said carrier, a pair of oppositely facing dogs pivotally connected to said carrier and engageable with said links of said endless chain for shifting said chain in one direction upon movement of said carrier in one direction and for shifting said endless chain in the other direction upon movement of said carrier in the other direction, said carrier including a stop for limiting pivotal movement of each of said dogs in one direction, whereby said dogs effect movement of said chain in the respective opposite directions, and said support including means for shifting the respective dogs from engagement with said chain links upon movement of said carrier in the other direction.

6. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said feeder means includes a plurality of horizontally extended and laterally spaced feeder conveyors having means for engaging said stands of pipe and moving the same on said rack beams to and from said positions, each of said conveyors including a horizontally extended support, an endless chain extended about said support, spaced pipe engaging members carried by said chain for engaging and maintaining the spaces between said pipe stands during movement thereof between said positions, and actuator means for intermittently moving said endless chain in increments equivalent to the space between adjacent pipe stands, said actuator means including a double-ended pressure actuated cylinder, a double-ended rod projecting from the ends of said cylinder, said rod being connected to said support, and means carried by said cylinder and engageable with said chain links upon reciprocation of said cylinder with respect to said rod for shifting said chain in opposite directions.

7. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said feeder means includes a plurality of horizontally extended and laterally spaced feeder conveyors having means for engaging said stands of pipe and moving the same on said rack beams to and from said positions, each of said conveyors including a horizontally extended support, an endless chain extended about said support, spaced pipe engaging members carried by said chain for engaging and maintaining the spaces between said pipe stands during movement thereof between said positions, and actuator means for intermittently moving said endless chain in increments equivalent to the space between adjacent pipe stands, said actuator means including a double-ended pressure actuated cylinder, a double-ended rod projecting from the ends of said cylinder, said rod being connected to said support, and means carried by said cylinder and engageable with said chain links upon reciprocation of said cylinder with respect to said rod for shifting said chain in opposite directions, said last-mentioned means including a pair of dogs pivotally connected to said cylinder, spring means interconnecting said dogs and biasing the same pivotally in one direction, stop means carried by said cylinder and disposed between said dogs for limiting pivotal movement of said dogs one toward the other, and an abutment member carried by said support and engageable by said dogs for pivotally moving one of said dogs away from the other of said dogs upon movement of said cylinder in one direction.

8. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said pipe rack means includes a number of said rack beams disposed in vertically spaced relation, support means mounting said vertically spaced rack beams for vertical movement relative to one another, means for successively moving said vertically spaced rack beams upwardly and allowing downward movement thereof, and said feeder means includes a plurality of horizontally extended and laterally spaced feeder conveyors, means supporting said feeder conveyors for vertical movement, and said feeder conveyors having means for engaging said stands of pipe on the respective vertically spaced rack beams and moving said stands of pipe to and from said predetermined positions.

9. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said pipe rack means includes a number of said rack beams disposed in vertically spaced relation, support means mounting said vertically spaced rack beams for vertical movement relative to one another, means for successively moving said vertically spaced rack beams upwardly and allowing downward movement thereof, and said feeder means includes a plurality of horizontally extended and laterally spaced feeder conveyors, means supporting said feeder conveyors for vertical movement, and said feeder conveyors having means for engaging said stands of pipe on the respective vertically spaced rack beams and moving said stands of pipe to and from said predetermined positions, said means supporting said feeder conveyors respectively including a post, a sleeve disposed on said post for vertical movement, and said conveyors including a support connected to said sleeve.

10. Apparatus for horizontally racking well pipe comprising in combination: pipe rack means including horizontally extended and laterally spaced rack beams having means for releasably holding stands of pipe in predetermined spaced positions on said beams, and feeder means for moving said stands of pipe to and from said positions when said stands of pipe are released, wherein said pipe rack means includes a number of said rack beams disposed in vertically spaced relation, support means mounting said vertically spaced rack beams for vertical movement relative to one another, means for successively moving said vertically spaced rack beams upwardly and allowing downward movement thereof, and said feeder means includes a plurality of horizontally extended and laterally spaced feeder conveyors, means supporting said feeder conveyors for vertical movement, and said feeder conveyors having means for engaging said stands of pipe on the respective vertically spaced rack beams and moving said stands of pipe to and from said predetermined positions, said means supporting said feeder conveyors respectively including a post, a sleeve disposed on said post for vertical movement, said conveyors including a support connected to said sleeve, and lift means for moving said sleeve vertically.

* * * * *